United States Patent [19]

Choe

[11] 4,130,702
[45] Dec. 19, 1978

[54] POLYACRYLOYLAMINOBENZOIC ACID, POLYMETHACRYLOYLAMINOBENZOIC ACID AND METHOD OF PREPARATION

[75] Inventor: Eui W. Choe, Randolph, N.J.

[73] Assignee: Celanese Corporation, New York, N.Y.

[21] Appl. No.: 871,280

[22] Filed: Jan. 23, 1978

[51] Int. Cl.$^2$ .......................... C08F 4/30; C08F 2/10; C08F 20/64; C08F 20/58
[52] U.S. Cl. ..................................... 526/93; 526/229; 526/240; 526/304
[58] Field of Search .................. 526/240, 304, 93, 229

[56] References Cited

U.S. PATENT DOCUMENTS 3,344,127   9/1967   Masson ................................. 526/240

*Primary Examiner*—Herbert J. Lilling
*Attorney, Agent, or Firm*—Kenneth A. Genoni

[57] ABSTRACT

Novel polymers derived from either acryloylaminobenzoic acid or methacryloylaminobenzoic acid are provided. The method of producing these polymers involves a free radical polymerization of the monomer at relatively low temperatures in an aqueous solution which contains an alkali metal hydroxide and a free radical initiator.

12 Claims, No Drawings

POLYACRYLOYLAMINOBENZOIC ACID, POLYMETHACRYLOYLAMINOBENZOIC ACID AND METHOD OF PREPARATION

BACKGROUND OF THE INVENTION

It is known in the art to improve the dye acceptability of acrylonitrile polymers by interpolymerizing them with a minor amount of p-acrylamidobenzoic acid or an alkali metal salt thereof, the acid and salt having the general formula:

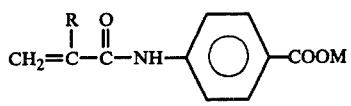

wherein R is hydrogen or methyl and M is hydrogen or an alkali metal.

As stated in U.S. Pat. No. 3,344,127, the acid monomer is present in an amount ranging from about 0.25% to about 10% and preferably from about 0.3% to about 4% based on the total monomer weight. The process proceeds via a free radical polymerization which can occur in numerous environments including an aqueous emulsion and yields a copolymer which can be utilized to provide fibers, films and filaments.

U.S. Pat. No. 3,344,127 makes clear, however, that the end polymers are primarily composed of acrylonitrile with the minor amount of p-acrylamidobenzoic acid being added to improve the dye acceptability of the polymer. The patent does not disclose or suggest that polymers composed of substantially pure p-acrylamidobenzoic acid could be produced.

It is also known in the art to prepare a related polymer derived from p-methacryloyloxybenzoic acid. This polymer essentially differs from the polymers of the present invention by having an oxygen group in place of the amino group. The manner of preparing the polymethacryloyloxybenzoic acid involves the reaction of the monomer in either dimethylformamide or cetyloxybenzoic acid. See Amerik et al, "Polymerization of p-Methacryloyloxybenzoic Acid in Mesomorphic and in Liquid States", *J. Poly Sci.*, Part C, No. 23 pp. 231–238 (1968); Blumstein et al, "Polymerization of p-Methacryloyloxy Benzoic Acid With Liquid Crystalline Media", in *Liquid Crystals* 3, Part II, pp. 1075–1087 (Brown & Labes, Ed., Gordon and Breach Science Publishers Inc., New York, N.Y., 1971); Blumstein et al, "Crystallinity and Order in Atactic Poly (acryloyloxybenzoic acid) and Poly (methacryloyloxybenzoic acid)," *Macromolecules*, Vol. 9, No. 2, pp. 243–247 (March - April 1976); and Blumstein et al, "Oriented Polymer Growth in Thermotropic Mesophases", *Macromolecules*, Vol. 8, No. 1, pp. 73–76, (1975).

In commonly assigned United States Ser. No. 871,282 filed concurrently herewith by Eui Won Choe, and entitled "Ultra-High Molecular Weight Polymethacryloyloxybenzoic Acid and Method of Preparation", there is described a polymer and a process for preparing the polymer which primarily differs from the polymer of the present invention by having an oxy group in lieu of the amino group.

In commonly assigned United States Ser. No. 871,281 filed concurrently herewith by Eui Won Choe, Marshall Tan and Robert Mark Mininni, and entitled "Process for Producing Anisotropic Dopes and Articles Thereof from Benzoic Acid Derivative Polymers" there is described a method for preparing anisotropic dopes. These dopes may be employed in the formation of fibers. The anisotropic dopes per se are also described.

It is therefore an object of this invention to provide a novel polymer prepared from substantially pure p-acrylamidobenzoic acid or p-methacrylamidobenzoic acid (hereafter referred to as acryloylaminobenzoic acid and methacryloylaminobenzoic acid, respectively).

It is another object of this invention to prepare a novel polymer which is capable of forming an anisotropic melt.

It is yet another object of this invention to provide a novel polymer which can be formulated into an aqueous anisotropic spinning dope suitable for fiber formation.

It is a further object of this invention to provide a novel process for preparing a polymer from acryloylaminobenzoic acid or methacryloylaminobenzoic acid which involves a free radical polymerization of the monomer in an aqueous environment at relatively low temperatures.

These and other objects, as well as the scope, nature and utilization of the invention will be apparent from the following summary and detailed description of the invention.

SUMMARY OF THE INVENTION

In one aspect, the present invention comprises a polymer having recurring units of the formula:

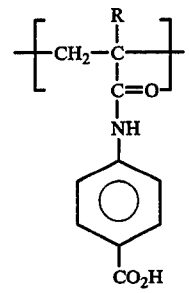

wherein R is hydrogen or methyl.

In another aspect, the present invention comprises a process for preparing this polymer. This process comprises:

(a) dissolving a monomer having the formula

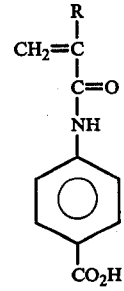

wherein R is hydrogen or methyl, in an aqueous solution of an alkali metal hydroxide and in the presence of a free radical initiator;

(b) allowing sufficient time for polymerization to occur, and (c) recovering the polymer from the aqueous solution.

DESCRIPTION OF PREFERRED EMBODIMENTS

The acryloylaminobenzoic acid and methacryloylaminobenzoic acid polymers of this invention are described as being "comb polymers" in that they possess mesophase forming aminobenzoate side chains depending from an acrylate or methacrylate backbone. The term "mesophase" defines a phase of matter intermediate the liquid and solid phases of the polymer. Due to the interaction of the depending sidechains, the polymers display a smectic arrangement of macromolecules in the mesophase. This layered or parallel plane arrangement gives the polymer improved stability, both along the backbone of the molecules and along the sidechains.

The polymers of the present invention can be utilized in the preparation of anisotropic dopes in accordance with the method disclosed in aforementioned U.S. Patent Application Ser. No. 871,281, filed concurrently herewith by Choe et al. As more fully explained therein, anisotropic dopes can be produced from such polymers as polyacryloylaminobenzoic acid or polymethacryloylaminobenzoic acid by forming the acid salts of the polymers in water containing Group I metal compounds or compounds containing a protonated amine group. Fibers are produced by extruding the dope into a coagulating bath. The fibers are characterized by their transparency, high orientation and crystallinity.

Fibers or other molded articles may also be derived from the polymers by shaping them from a polymer melt.

The monomers utilized in the formation of the acryloylaminobenzoic acid and methacryloylaminobenzoic acid polymers of this invention can be produced by any known method. Typical of such methods is that described in the aforementioned U.S. Pat. No. 3,344,127, the disclosure of which is incorporated by reference for purposes of brevity and clarity. Briefly, the method for preparing acryloylaminobenzoic acid involves the addition of acrylyl chloride in chloroform to an agitated mixture of p-aminobenzoic acid and potassium carbonate. After a suitable reaction time, any undissolved material is removed from the mixture. The monomer is precipitated by adding concentrated hydrochloric acid, removed from the mixture by filtration, and recrystallized in a mixture of ether, water and acetone. Methacryloylaminobenzoic acid may be similarly formulated by employing methacrylyl chloride in place of the acrylyl chloride.

An alternate method of synthesizing the monomers involves the reaction of either acrylyl chloride or methacrylyl chloride with p-aminobenzoic acid in N-methyl-2-pyrrolidone at $-25°$ C. The monomer is recovered from the reaction mixture via conventional techniques analogous to that discussed above.

The acryloylaminobenzoic acid and methacryloylaminobenzoic acid polymers of this invention are formed via the free radical polymerization of an alkali metal salt of the monomer in oxygen free water.

The polymers of this invention may either be homopolymers or copolymers wherein a minor amount, i.e., less than about 50% by weight, of the polymer is derived from a compound such as acrylic acid. Other monomers known to those skilled in this art may also be used. Therefore, as used herein, the term "polymer" is meant to include both homopolymers and copolymers of acrylaminobenzoic acid and methacryloylaminobenzoic acid.

The presence of oxygen will tend to inhibit the polymerization or will terminate the growing polymer radical, thus resulting in a lower molecular weight polymer. To ensure that the reaction environment is kept oxygen free, the reaction mixture may be maintained under a blanket of nitrogen or other inert gas, such as argon at a positive pressure throughout the polymerization.

The mechanism of polymerization is believed to be as follows:

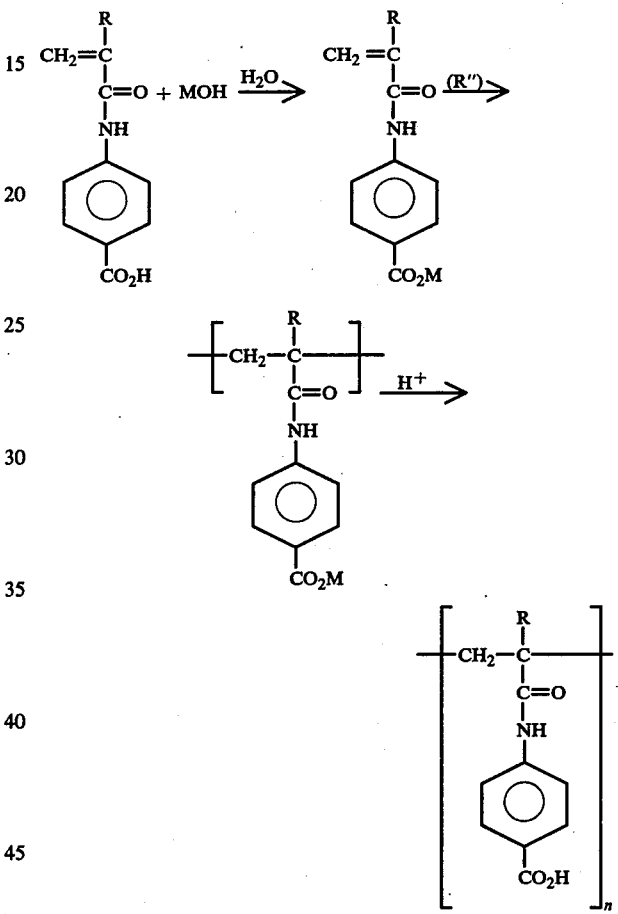

wherein R is hydrogen or methyl and M is an alkali metal. Although sodium is the preferred alkali metal, other alkali metals such as lithium, potassium and cesium may also be employed. It will be apparent from the above reaction that the monomer is initially dissolved in an aqueous solution of an alkali metal hydroxide and is polymerized in the presence of a free radical derived from the free radical initiator.

The related acid monomer is present in the reaction mixture in an amount ranging from about 0.5% to about 30% and preferably from about 5% to about 10%, all by weight of the reaction mixture. While monomer concentrations substantially above 30% may be utilized, the higher concentrations tend to decrease the molecular weight of the resulting polymer.

The reaction may be carried out at a temperature of from about $-10°$ C. to about 100° C., typically from about $-5°$ C. to about 50° C., and preferably from about 0° C. to about 5° C. To obtain the desired polymer, it is not necessary to maintain the temperature constant throughout the reaction. Thus, for example, polymerization may be initiated at a temperature of from about 0° to about 5° C. and later allowed to rise to higher temperatures such as room temperature.

To promote the polymerization of the monomer it is necessary to add a free radical initiator to the reaction mixture. The initiator is present in amounts ranging between about 0.1% and about 5% and preferably from about 1% to about 2% by weight based on the monomer. A preferred initiator is potassium persulfate. It is to be understood, however, that other known initiators, for example ammonium persulfate, may also be utilized. Mixtures of such initiators may also be used.

After the reaction has been initiated, sodium bisulfite, ferrous sulfate, or mixtures thereof may be added to the reaction mixture in order to accelerate the polymerization. The accelerator is added in an amount of generally from about 0.05% to about 2.5% and preferably from about 0.5% to about 1.5% based on the monomer weight. The function of the sodium bisulfite and/or the ferrous sulfate is to provide free radicals through the dissociation of the free radical initiator, e.g. potassium persulfate. Should such compounds not be added to the reaction mixture, the polymerization reaction would occur at a much slower rate.

The time necessary for the completion of the polymerization is dependent upon reaction parameters such as the temperature, monomer concentration and initiator employed. While no upper time limit has been established, reaction times may be generally from about 1 to about 24 hours, preferably from about 6 to about 8 hours.

Upon completion of the reaction, the polymer is recovered by first precipitating it from solution via the addition of a strong acid. The type of acid is not critical to the operation of the process as long as it serves to precipitate the polymer. Hydrochloric acid is preferred although other acids may also be used. The precipitated polymer is then separated from the remainder of the reaction mixture, washed and dried.

The polymerization process may be operated on a semi-continuous, continuous or, preferably, on a batch basis.

The following example is given as a specific illustration of the process. It should be understood, however, that the invention is not limited to the specific details set forth in this example.

EXAMPLE

Sodium methacryloylaminobenzoic acid is prepared by dissolving 9.95 grams of methacryloylaminobenzoic acid in 152 mls of an aqueous solution containing 1.94 grams of sodium hydroxide. Twelve mls of 2N NaOH solution is added in order to obtain a clear solution. To this solution maintained at 0° C.–5° C. and under a nitrogen blanket is added 0.15 grams of potassium persulfate in 7 mls of water, followed after one minute by 0.075 grams of sodium bisulfite in 5 mls of water. The monomer concentration in the reaction mixture is 5.4% by weight. After maintaining that temperature for 10 hours, it is allowed to rise to room temperature and stirred for an additional 16 hours. The reaction mixture is acidified with 100 mls of 20% by weight hydrochloric acid to precipitate the polymer. The polymer is filtered, washed with water, boiled in glacial acetic acid and filtered, washed with water, and then dried at 120° C. and 0.1 mm Hg to yield 9.85 grams of polymethacryloylaminobenzoic acid with an inherent viscosity of 0.09 (determined as a 0.2% by weight solution in 2N NaOH at 25° C.).

The final polymer product has a melting point of about 265° C. and forms an anisotropic melt at 330° C. upon shearing. Although a slight decomposition accompanies the formation of the anisotropic melt, the molten polymer may be utilized in the production of fibers, films and molded articles.

Polyacryloylaminobenzoic acid may be produced in a similar manner by employing the appropriate monomer.

Although the invention has been described with a preferred embodiment, it is to be understood that variations and modifications may be employed as will be apparent to those skilled in the art. Such variations and modifications are to be considered within the scope of the following claims.

I claim:

1. A polymer capable of forming an anisotropic melt consisting essentially of recurring units of the formula:

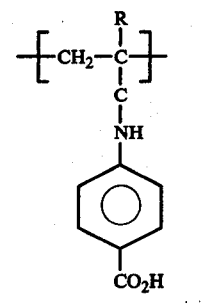

wherein R is hydrogen or methyl.

2. The polymer of claim 1 wherein R is methyl.
3. The polymer of claim 1 wherein R is hydrogen.
4. A process for preparing a polymer capable of forming an anisotropic melt consisting essentially of:
   (a) dissolving a monomer having the formula:

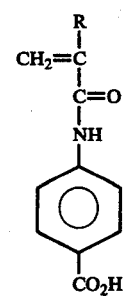

wherein R is hydrogen or methyl, in an aqueous solution of an alkali metal hydroxide and in the presence of a free radical initiator,
   (b) allowing sufficient time for polymerization to occur, and
   (c) recovering the polymer from the aqueous solution.
5. The process of claim 4 wherein R is hydrogen.
6. The process of claim 4 wherein R is methyl.
7. The process of claim 6 wherein the alkali metal is sodium.
8. The process of claim 4 wherein said mixture is maintained at a temperature of from about −10° C. to about 100° C. during a substantial portion of the reaction.

9. The process of claim 4 wherein the dissolved monomer comprises from about 0.5% to about 30% of the weight of the reaction mixture.

10. A process for preparing a polymer capable of forming an anisotropic melt consisting essentially of:

(a) dissolving from about 5% to about 10% by weight of a monomer having the formula:

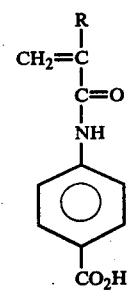

wherein R is hydrogen or methyl, in an aqueous solution of sodium hydroxide and in the presence of a free radical initiator, said reaction mixture being maintained under a blanket of inert gas and at a temperature of from about 0° C. to about 5° C., (b) adding a polymerization accelerator selected from the group consisting of sodium bisulfite, ferrous sulfate and mixtures thereof, (c) allowing sufficient time for polymerization to occur, and 11. The process of claim 10 wherein R is hydrogen.

12. The process of claim 10 wherein R is methyl.

* * * * *